US006230829B1

(12) United States Patent
Martin et al.

(10) Patent No.: US 6,230,829 B1
(45) Date of Patent: May 15, 2001

(54) TRANSMISSION APPARATUS FOR A VEHICLE HAVING AT LEAST TWO DRIVABLE AXLES

(75) Inventors: Louis Martin, Compiegne; Jean-Claude Cousin, Pontpiont, both of (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 09/496,505

(22) Filed: Feb. 2, 2000

(30) Foreign Application Priority Data

Feb. 5, 1999 (FR) .................................................. 99 01359

(51) Int. Cl.⁷ ................................................. B60K 17/356
(52) U.S. Cl. ........................................... 180/6.3; 180/308
(58) Field of Search .................................... 180/6.24, 6.3, 180/6.48, 302, 308

(56) References Cited

U.S. PATENT DOCUMENTS 3,161,246   12/1964   Meeker et al. .

FOREIGN PATENT DOCUMENTS

| 0547947 | 6/1993 | (EP) . |
| 0627335 | 12/1994 | (EP) . |
| 2719001 | 10/1995 | (FR) . |
| 1554443 | 10/1999 | (GB) . |
| 8912558 | 12/1989 | (WO) . |
| 9633883 | 10/1996 | (WO) . |

*Primary Examiner*—Kevin Hurley
(74) *Attorney, Agent, or Firm*—Ladas & Parry (57) ABSTRACT

Each drivable axle of the apparatus has two hydraulic motors, one for each side of the vehicle. The apparatus includes two analogous closed transmission circuits, one for each side of the vehicle. The hydraulic motors of the second axle are dual-capacity motors having three main connections. In each closed circuit, the first main connection of the dual-capacity motor and the first main connection of the motor of the first axle are respectively connected continuously to each of the two ports of the pump of the circuit in question, and each circuit further includes a selector having at least two positions and disposed on interconnection ducts between the pump, the second and third main connections of the dual-capacity motor and the second main connection of the motor of the first axle.

18 Claims, 4 Drawing Sheets

TRANSMISSION APPARATUS FOR A VEHICLE HAVING AT LEAST TWO DRIVABLE AXLES

The present invention relates to vehicle transmission apparatus comprising first and second drivable axles, each drivable axle having two hydraulic motors, one on each side of the vehicle, the apparatus comprising two analogous closed transmission circuits, one for each side of the vehicle, each closed circuit having a hydraulic pump as well as a motor of the first axle and a motor of the second axle.

BACKGROUND OF THE INVENTION

Apparatus of that type is known from Document EP 0 627 335 which shows a hydrostatic transmission vehicle having a plurality of axles, two pumps feeding respective ones of the motors that drive the wheels on each of the two sides of the vehicle. That apparatus offers the advantage of adjusting the respective cylinder capacities of the two pumps in identical manner for travelling straight ahead, or in different manners when, for example, to make a tight turn, it is necessary for the motors driving the wheels on one side of the vehicle to deliver torque that is higher than the torque delivered by the motors driving the wheels on the other side.

Thus, the apparatus disclosed by Document EP 0 627 335 makes it possible to obtain a behavior that differs between the wheels on one side of the vehicle and the wheels on the other side. Unfortunately, it does not make it possible to manage differences in behavior between the wheels situated on the same side of the vehicle.

Document EP 0 547 947 also discloses a vehicle having hydrostatic transmission including three-port dual-capacity motors. All of the motors are fed by the same pump, and it is possible to avoid undesirable differences in behavior between the wheels of the various axles, e.g. wheel spin. Thus, it is possible to achieve a differential lock effect between the front axle and the rear axle, but not to manage in different manners the feed to the motors driving the wheels on one side or the other of the vehicle.

The above-mentioned known apparatus thus offers certain advantages which unfortunately have corresponding drawbacks that are problematic to various extents depending on the conditions under which the vehicle is used.

OBJECTS AND SUMMARY OF THE INVENTION

An object of the invention is to provide apparatus that offers the advantages of the above-mentioned known apparatus, but that is free or substantially free from the drawbacks thereof.

This object is achieved by the fact that the hydraulic motors of the second axle are dual-capacity motors, each of which comprises two elementary motors, each elementary motor having first and second elementary connections, for feed or discharge purposes, the first elementary connections being in common to form a first main connection of the dual-capacity motor, while the second elementary connections are separate and form respectively a second main connection and a third main connection of the dual-capacity motor, each of the hydraulic motors of the first axle having at least first and second main connections, for feed or discharge purposes, by the fact that, in each closed circuit, the first main connection of the dual-capacity motor and the first main connection of the motor of the first axle are connected continuously to respective ones of the two ports of the pump of the circuit in question, and by the fact that each closed circuit further includes a selector having at least two positions, disposed on interconnection ducts between the pump, the second and third main connections of the dual-capacity motor and the second main connection of the motor of the first axle.

The invention thus provides an original interconnection between the motors of each of the two closed circuits of the apparatus which includes dual-capacity motors and makes provision, for each closed circuit, to place the selector precisely on interconnection ducts between the pump, the second and third main connections of the dual-capacity motor, and the second main connection of the motor of the first axle. Depending on the configuration of the selectors, it is possible, for example, for each closed circuit, to connect one of the elementary motors of the second axle in series with the motor of the first axle, while the other elementary motor of the second axle can be fed in parallel or can be deactivated.

In any event, insofar as the first main connection of the dual-capacity motor and the first main connection of the motor of the first axle are connected continuously to respective ones of the two ports of the pump of the closed circuit in question, provision is made for one of these two motors always to be fed before the other, it being possible however to chose the selector such that, in one of its positions, it makes it possible to deactivate both elementary motors of the dual-capacity motor, when the vehicle is to travel at high speeds with drive being provided by the motor of the first axle only.

Thus, advantageously, for each closed circuit, the selector has a position for deactivating the second axle, in which position it puts in communication the second and third main connections of the dual-capacity motor and causes them to communicate with that port of the pump to which the first main connection of said dual-capacity motor is connected.

Advantageously, for each closed circuit, the selector has a flow-rate sharing position in which the second main connection of the dual-capacity motor is connected to that port of the pump which is connected to the first main connection of the motor of the first axle, in parallel therewith.

Thus, one of the elementary motors of the dual-capacity motor is fed in parallel with the motor of the first axle, so that the flow rate is shared between said elementary motor which belongs to the second axle and the motor of the first axle.

In this position, it is possible, for example, to chose to connect the third main connection of the dual-capacity motor to the second main connection of the motor of the first axle. This is then a flow-rate sharing and differential lock position because the second elementary motor of the dual-capacity motor is disposed in series relative to the motor of the first axle, while the first elementary motor is disposed in parallel relative to said motor of the first axle.

It is also possible to choose that, for each closed circuit, the selector has a flow-rate sharing and maximum torque position in which the second and third main connections of the dual-capacity motor and the first main connection of the motor of the first axle are connected in parallel to the same port of the pump while the first main connection of the dual-capacity motor and the second main connection of the motor of the first axle are connected in parallel to the other port of the pump.

In which case, for each closed circuit, all of the motors are fed in parallel, so that the total cylinder capacity fed by the pump is equal to the sum of the cylinder capacity of the motor of the first axle and of the cylinder capacity of the dual-capacity motor of the second axle. The vehicle can then develop maximum torque, which is particularly suitable when it is being used under working conditions, on a building site or on difficult terrain. This position thus corresponds to the flow-rate being shared and to maximum torque being obtained.

It is also advantageous that, for each closed circuit, the selector has a flow-rate transfer position for transferring the flow rate to the second axle, in which position the first main connection of the motor of the first axle is connected to a port of the pump, while the second main connection of the dual-capacity motor communicates with that port of the pump which is connected to the first main connection of said dual-capacity motor, and that the third main connection of the dual-capacity motor is connected to the second main connection of the motor of the first axle. In which case, the first elementary motor of the dual-capacity motor is deactivated, and the flow rate of the motor of the first axle is transferred to the second elementary motor, so that both of the motors rotate at the same speed, which amounts to obtaining a differential lock between the wheels of the two axles, for each side of the vehicle. This differential lock is obtained even though the only cylinder capacity that is fed is the cylinder capacity of the second elementary motor, so that the speed of the vehicle can be relatively high.

The apparatus advantageously includes means for controlling the selectors of both of the closed circuits simultaneously.

These means make it possible to obtain the same drive for each side of the vehicle, regardless of the positions of the two selectors. This is necessary for driving on the road, and also for travelling straight ahead without skidding on a working terrain such as a building site.

Advantageously, the apparatus includes means that, during turning, cause the simultaneous control of the selectors of the two closed circuits to cease, and control said selectors such that the total cylinder capacity connected to a port of the pump of the closed circuit situated on the side of the vehicle that is on the inside of the turn is greater than the total cylinder capacity that is connected to the corresponding port of the pump of the closed circuit situated on the side of the vehicle that is on the outside of the turn.

By causing the simultaneous control of the selector to cease, it is possible to obtain drive conditions that differ from one side of the vehicle to the other, e.g. by intentionally choosing to cause the wheels on one side of the vehicle to slip relative to the wheels on the other side. This makes it possible to turn the vehicle on a turning circle of very small radius.

BRIEF DESCRIPTION OF THE DRAWINGS

The invention will be well understood, and its advantages will appear more clearly on reading the following detailed description of an embodiment shown by way of non-limiting example. The description refers to the accompanying drawings, in which.

MORE DETAILED DESCRIPTION

Figure 1:
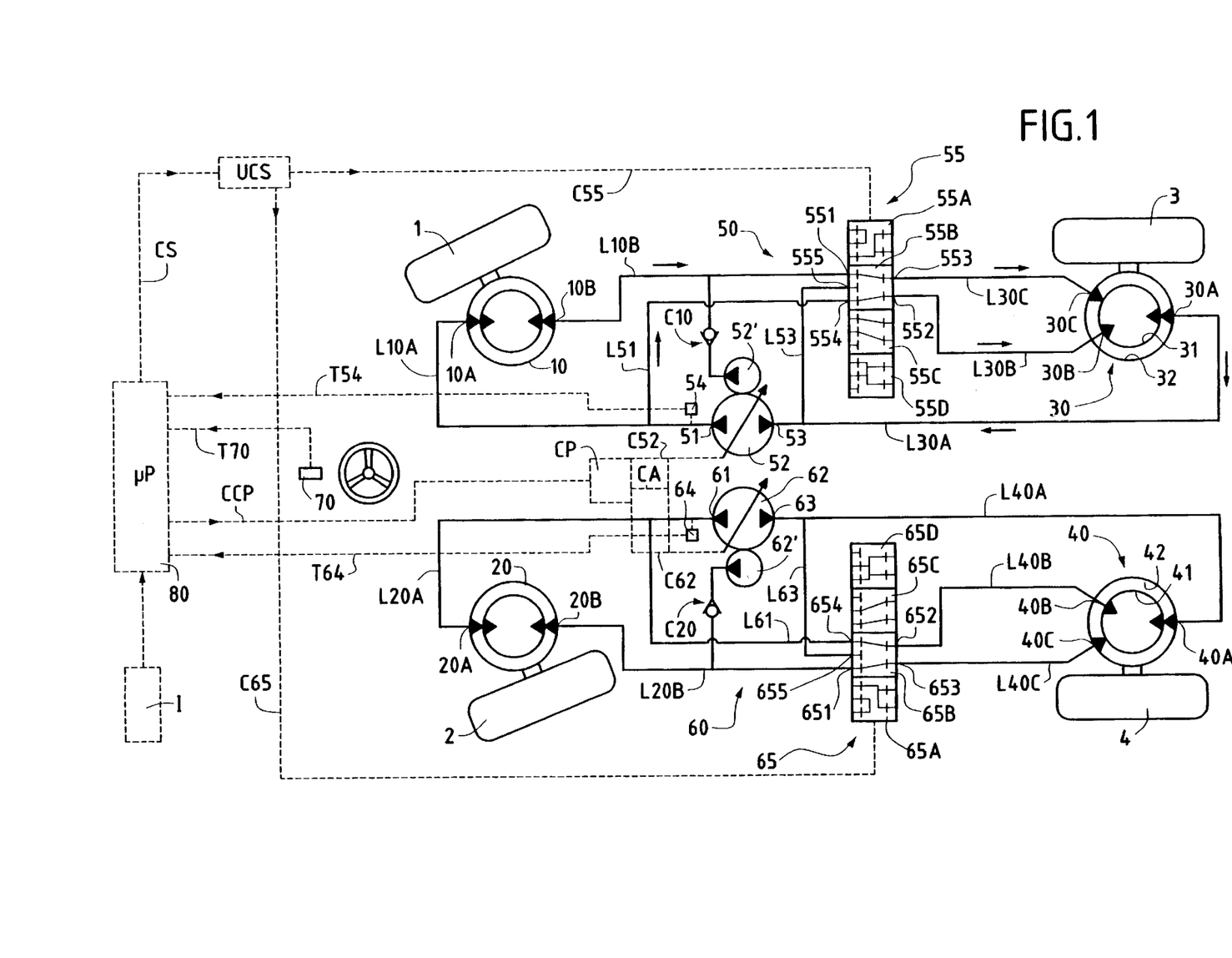
FIG. 1 is a diagram of apparatus of the invention, showing the selectors of the two closed circuits in one position.

The apparatus shown in FIG. 1 provides the transmission for a vehicle having four drivable wheels, respectively 1, 2, 3, and 4, the wheels 1 and 2 being steerable. For example, for a farm vehicle such as a combine harvester, the steerable wheels are the rear wheels, while for a farm tractor, the steerable wheels are the front wheels.

The vehicle is provided with two axles, the first drivable axle being provided with the two hydraulic motors 10 and 20 that serve respectively to drive the wheels 1 and 2, while the second drivable axle is provided with the two hydraulic motors 30 and 40 that serve respectively to drive the wheels 3 and 4. Thus, the motors 10 and 30 serve to drive the wheels on a first side of the vehicle and belong to a first closed circuit 50, while the motors 20 and 40 serve to drive the wheels on the other side of the vehicle and belong to a second closed circuit 60. Each of the closed circuits 50 and 60 includes a respective variable cylinder capacity hydraulic pump 52 or 62.

The hydraulic motors 30 and 40 of the second axle are "three-port" dual-capacity motors. Thus, each of them comprises first and second elementary motors, respectively 31 & 32 for the motor 30, and 41 & 42 for the motor 40. Each of the elementary motors 31 and 32 is provided with a first elementary connection which serves for feed or for discharge purposes depending on the direction of flow of the fluid, these elementary connections being in common to form a first main connection 30A of the dual-capacity motor 30. Similarly, the first elementary connections of the elementary motors 41 and 42 are in common so as to form a first main connection 40A of the motor 40.

The first elementary motor 31 is provided with a second elementary connection which serves for discharge or feed purposes depending on the direction of flow of the fluid, and which forms a second main connection 30B for the motor 30, while the elementary motor 32 is provided with a second elementary connection which forms the third main connection 30C of the dual-capacity motor 30. Similarly, the elementary motors 41 and 42 have second elementary connections which form respectively the second main connection 40B and the third main connection 40C of the motor 40.

Each of the motors of the first axle has first and second main connections, respectively 10A & 10B for the motor 10, & 20A and 20B for the motor 20.

The motors 10 and 20 may be motors each having a single operating cylinder capacity, or else, as in the example shown, motors each having a plurality of operating cylinder capacities, e.g. 2. They may also be motors of the same type as the motors 30 and 40.

Each of the pumps 52 and 62 has two ports, respectively 51 & 53 for the pump 52, and 61 & 63 for the pump 62, the two ports serving respectively for fluid delivery and for fluid intake depending on the operating direction of the pump. In the first closed circuit 50, the first main connection 30A of the motor 30 is connected continuously to the port 53 via an interconnection duct L30A, while the first main connection of the motor 10 is connected continuously to the port 51 via a duct L10A. Likewise, for the circuit 60, the connection 40A is connected continuously to the port 63 of the pump via a duct L40A, and the connection 20A is connected continuously to the port 61 of the pump via a duct L20A.

Each of the closed circuits 50 and 60 includes a respective selector 55 or 65.

In the invention, each of the selectors has at least two positions, and said selectors are disposed on interconnection ducts between the pump of the closed circuit, the second and third main connections of the dual-capacity motor, and the second main connection of the motor of the first axle.

FIG. 1 shows selectors 55 and 65 in the form of selectors each capable of taking up four positions, respectively 55A, 55B, 55C, 55D, and 65A, 65B, 65C, 65D, and each having five ports.

The first port 551 of the selector 55 is connected to the main connection 10B of the motor 10 via a duct L10B while its second port 552 is connected to the main connection 30B via a duct L30B. The third port 553 is connected to the main connection 30C via a duct L30C. The fourth port 554 is connected to the duct L10A, i.e. to the main connection 10A and to the port 51 of the pump via a duct L51, while the fifth port 555 is connected to the duct L30A, i.e. to the connection 30A, and to the orifice 53 of the pump via a duct L53. Similarly, the first, second, third, fourth, and fifth ports 651, 652, 653, 654, and 655 are respectively connected to the main connection 20B via a duct L20B, to the main connection 40B via a duct L40B, to the main connection 40C via a duct L40C, to the duct L20A via a duct L61, and to the duct L40A via a duct L63.

The selectors 55 and 65 are identical, and, in general manner, the closed circuits 50 and 60 are identical.

The fact that the selectors have a large number of positions and ports makes it possible for the closed circuits to take up a large number of configurations. In general, each of the selectors has at least two positions, corresponding, for example, to a situation in which the vehicle is travelling along a road, and to a particularly demanding working situation. Thus, the selectors may have at least four positions, in the same way as they may have at least five ports. For example, as explained below, the fourth and fifth ports 554, 555, 654, and 655 serve respectively, via the ducts L51, L53, L61, L63, to connect one and/or the other of the elementary motors of the closed circuit to one or other of the ports of the pump of the circuit. In particular, when combined with the second and third ports 552, 553, and 652, 653, the fourth ports 554 and 654 may make it possible for the second elementary motors of the dual-capacity motors to be fed in parallel with the motors of the first axle.

FIG. 1 shows the selectors in their second position 55B and 65B. This is a flow-rate sharing position because, for each closed circuit, the ports 552 and 554 or respectively 652 and 654 are interconnected, which amounts to connecting the second main ports 30B, 40B of the dual-capacity motors 30, 40 to those ports 51, 61 of the pumps to which the first main connections 10A and 20A of the motors 10 and 20 are connected. Thus, when the two selectors 55 and 65 take up their flow-rate sharing positions, the first elementary motors 31 and 41 are fed in parallel with the motors of the first axle if it is considered that the first ports 51 and 61 of the pumps are delivery ports.

Therefore, the total cylinder capacity available for driving the vehicle is, for each closed circuit, the sum of the active cylinder capacity of the motor of the first axle and of the cylinder capacity of the first elementary motor of the dual-capacity motor of the second axle.

In FIG. 1, in addition, the third main connection 30C, 40C of the dual-capacity motor 30 and 40 is connected to the second main connection 10B, 20B of the motor of the first axle 10, 20 (the ports 551 and 553 of the selector 55 are interconnected, as are the ports 651 and 653 of the selector 65). In other words, for each closed circuit, the second elementary motor of the dual-capacity motor is connected in series with the motor of the first axle. For each closed circuit, it is thus possible to obtain a differential lock between the two wheels, respectively 3 & 1 and 4 & 2, thereby avoiding wheel spin.

To facilitate understanding of the circuit shown in FIG. 1, the direction of flow of the fluid is indicated by considering that the port 51 of the pump is a delivery port, the motors of the first axle (steerable wheels) being fed before the motors of the second axle in forward drive.

Advantageously, the apparatus includes means for satisfying a bottom pressure limit and a top pressure limit in the ducts L10B and L20B. In a manner known per se, these means may comprise a pressure relief valve (not shown) and a booster valve, respectively C10 and C20, associated with a booster pump, respectively 52' and 62'. Thus, for each closed circuit, both the motor (10, 20) of the first axle and the dual-capacity motor (20, 40) are protected against pressure surges and against cavitation phenomena.

Figure 2:
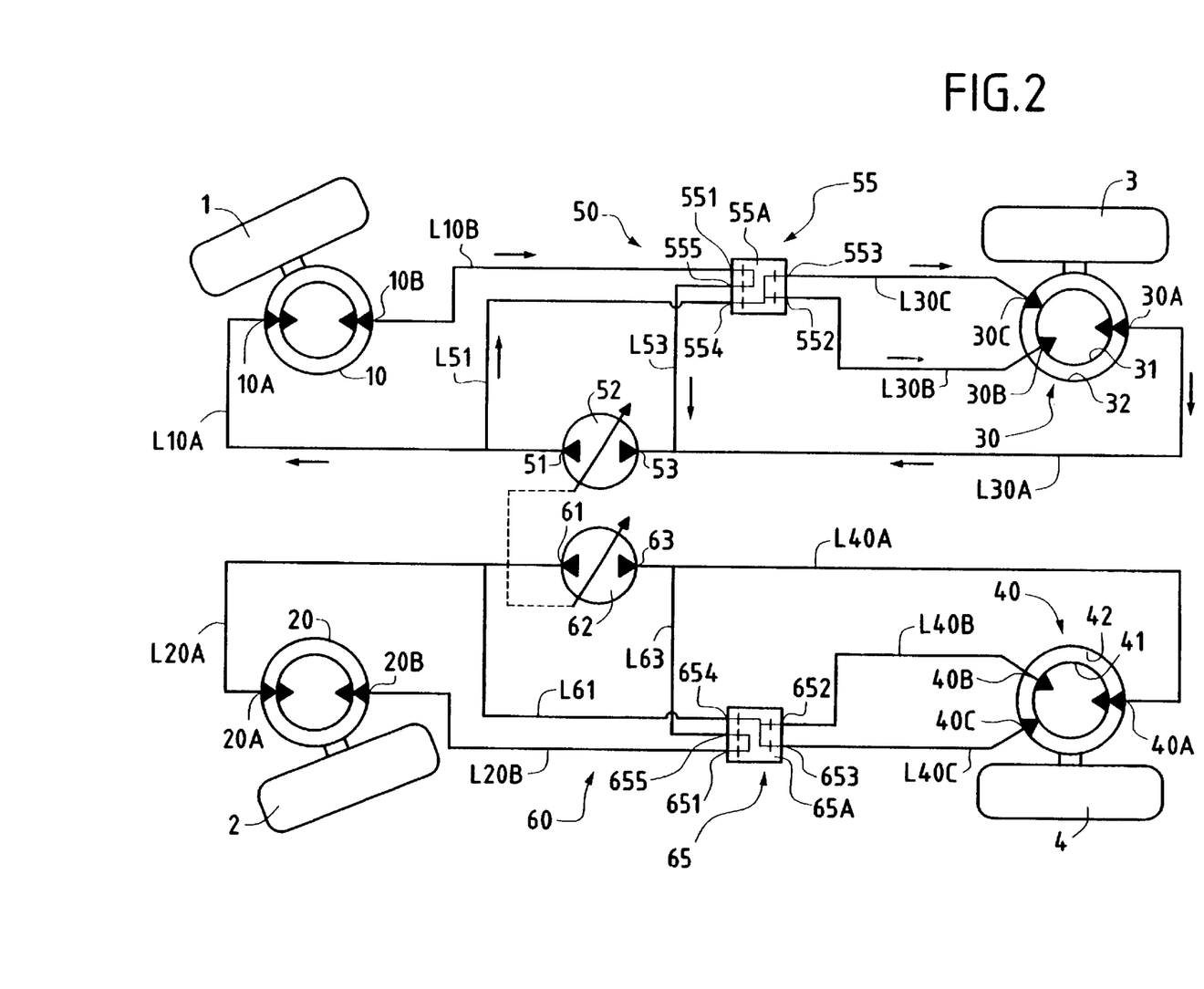
FIGS. 2 to 4 show apparatus of the invention with the selectors being in different positions.

FIG. 2 shows the configuration of the apparatus of the invention when the selectors 55 and 65 are in their positions 55A and 65A.

This is a maximum torque position, in which the motors are fed in parallel in each closed circuit. Thus, for the circuit 50, the main connection 10A of the motor 10 is connected to the port 51 of the pump as it is continuously, while the second main connection 10B of said motor is connected to the port 53 by means of the fact that the ducts L10B and L53 are interconnected by the link between the ports 551 and 555 of the selector. The second and third main connections 30B and 30C of the motor 30 are connected to the orifice 51, the ducts L30B, L30C, and L51 being connected via the link between the ports 552, 553, and 554 of the selector. The main connection 30A is normally connected to the port 53. Similarly, for the circuit 60, main connections 40B and 40C are connected in parallel to the port 61 of the pump with the main connection 20A of the motor 20, while the main connection 20B of the motor 20 and the main connection 40A of the motor 40 are connected in parallel to the port 63. In which case, the total available cylinder capacity is, for each closed circuit, the sum of the cylinder capacity of the motor of the first axle, and of the cylinder capacities of the two elementary motors of the motor of the second axle.

Figure 3:
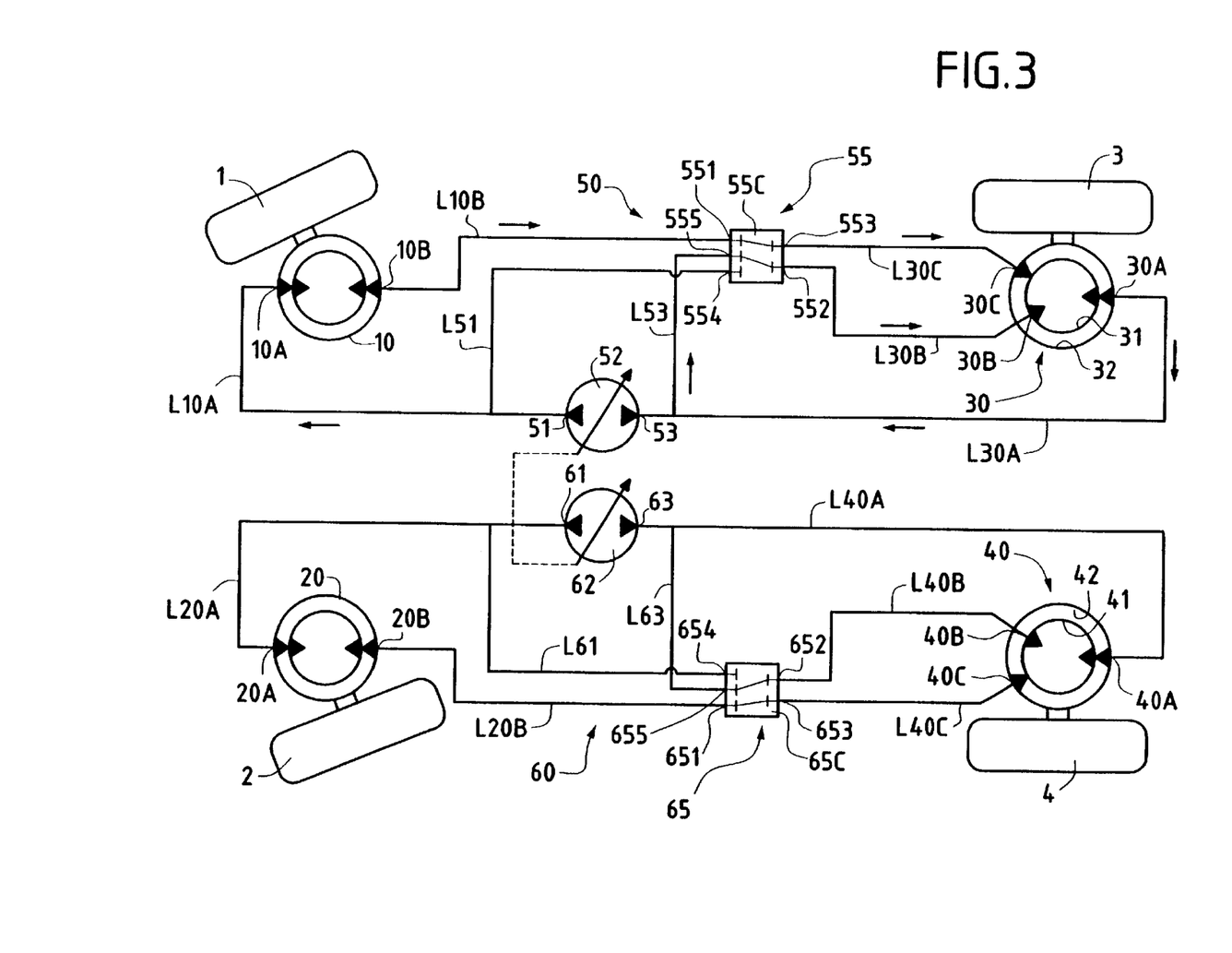

FIG. 3 shows the selectors in their flow-rate transfer positions 55C, 65C in which they transfer the flow rate to the first axle. All of the fluid delivered or sucked in via the port 51, 61 of the pump 52, 62 goes via the first main connection 10A, 20A of the motor 10, 20 of the first axle. For example, for the circuit 50, the first connection 10A of the motor 10 is normally connected to the port 51, while all of the main connections of the dual-capacity motor 30 are isolated from said first main connection. Thus, considering the second elementary motor 32, it can be observed that its connection 30C is connected in series with the main connection 10B of the motor 10, the ducts L10B and L30C being interconnected via the link between the ports 551 and 553 of the selector. Since the connection 30A is connected to the port 53 of the pump, the elementary motor 32 is active and is disposed in series with the motor 10. In this operating mode, the cylinder capacities of the motor 32 and of the motor 10 are equal. In contrast, the elementary motor 31 is inactive because the main connection 30B is connected to the same port 53 as the main connection 30A, via the link between the ports 552 and 555 which interconnect the ducts L53 and L30B.

It is indicated above that the cylinder capacity of the motor 32 is equal to the cylinder capacity of the motor 10 in this configuration. Since the motor 10 comprises two operating cylinder capacities, it is conceivable that this selector position is possible only when the total cylinder capacity of the motor 10 is active, this cylinder capacity being equal to that of the motor 32.

In the flow-rate transfer position in which the flow rate is transferred to the second axle, it is thus the total active cylinder capacity of the motors of the first axle that determines the torque developed by the motors of the apparatus, and there is a differential lock between the motors of the same side of the vehicle.

Figure 4:
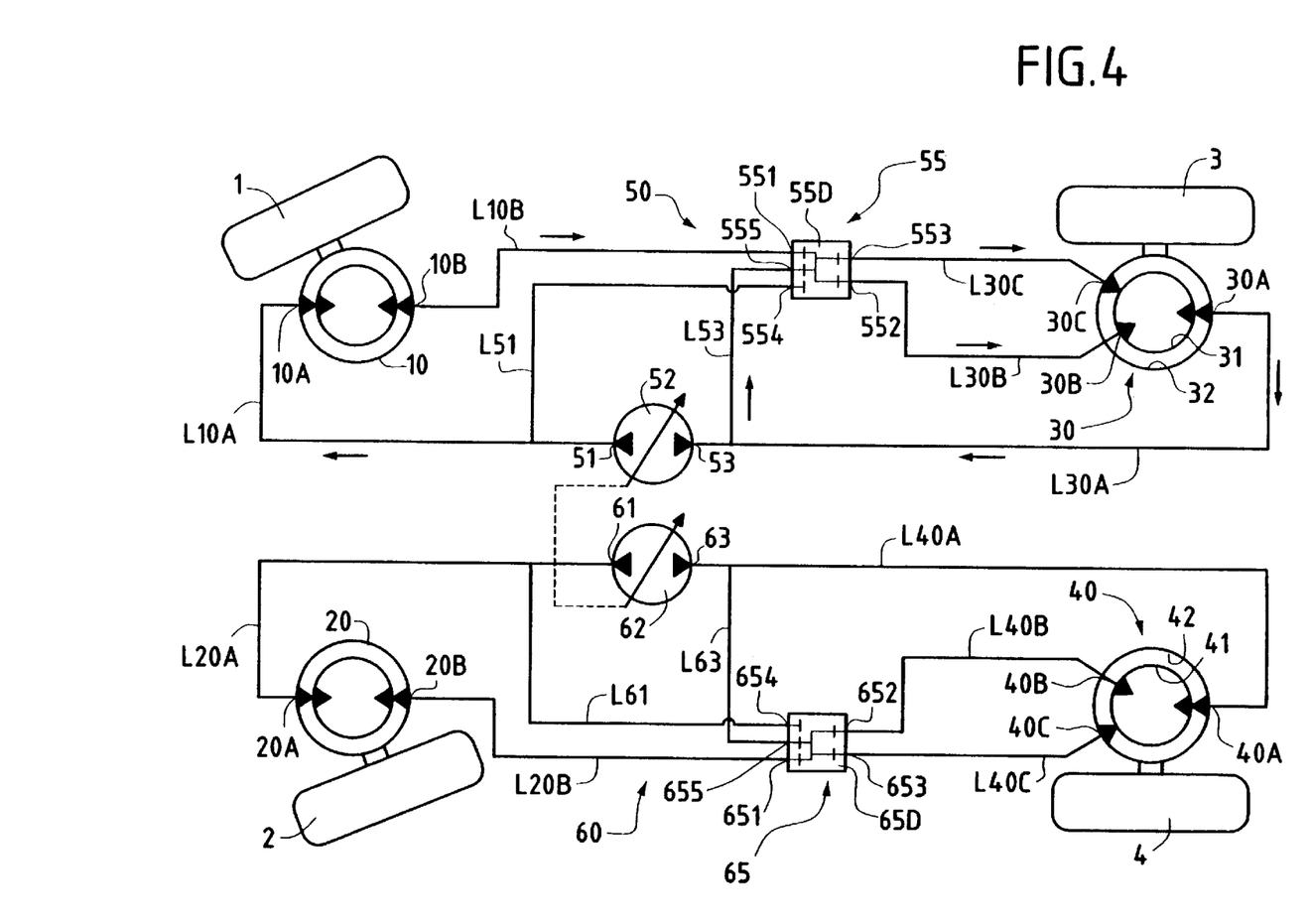

A description follows of FIG. 4 which shows the selectors 55 and 65 in their positions 55D and 65D, i.e. in a situation in which, for each closed circuit, the fluid flow rate is entirely transferred to the motor of the first axle, the motor of the second axle being totally inactive. Considering the circuit 50, it can be observed that main connections 30B and 30C of the dual-capacity motor 30 are put in communication via the link between the ports 553 and 552 of the selector, and also in communication with the port 53 via the link between said ports and the port 555. Since the first main connection 30A of the motor 30 is also connected to the port 53, the motor 30 is totally inactive. The second main connection 10B of the motor 10 is also connected directly to the port 53 because the duct L10B is connected to the duct L53 via the link between the port 551 of the selector and all of the other ports of said selector except for the port 554. The situation is the same for the circuit 60 for which only the motor 20 is active.

This configuration is suitable for when the vehicle is travelling under conditions under which it must be possible for the speed to be high without it being necessary to have traction torque that is high, e.g. on the road. If, for the motors 10 and 20, only one of the two cylinder capacities is active, the speed is further increased.

The apparatus shown in FIG. 1 includes means for controlling the selectors 55 and 65 simultaneously. Thus, two control lines are shown, respectively C55 and C65, connected to a selector control unit UCS. Although the control means for controlling the displacement of the selectors between one or other of their positions are not shown in detail, it can be understood that they can be of any known type, in particular electrical, electronic, or hydraulic.

The apparatus further advantageously includes means making it possible, during turning, to cause the simultaneous control of the selectors 55 and 65 to cease and to control the selectors such that the total cylinder capacity connected to a port of the pump of the closed circuit situated on the side of the vehicle that is on the inside of the turn is greater than the total cylinder capacity connected to the corresponding port of the pump of the closed circuit situated on the side of the vehicle that is on the outside of the turn. As a result, the motors driving the wheels on the outside of the turn can, for the same fluid flow rate, drive the wheels that are coupled to them at a speed higher than the speed at which the wheels coupled to the motors on the inside of the vehicle are driven. For example, if the wheels 1 and 3 of the circuit 50 are on the outside, the selector 55 can be controlled such that it takes up its small cylinder capacity position 55D, while the selector 65 is controlled such that it takes up its position 65B so that, in the circuit 60, the cylinder capacities of the motor 20 and of the motor 42 are active.

For this purpose, provision is made so that, as a function of a steering angle of the vehicle, as measured by a sensor 70 for example, the selector control unit UCS receives information to displace the selectors 55 and 65 separately into two distinct positions. For example, the information on the steering angle is transmitted, via a transmission line T70, to a microprocessor 80 which transmits control information to the selector control unit UCS via a control line CS.

It is indicated above that the pumps 52 and 62 have variable cylinder capacities. In FIGS. 2 to 4, the dashed lines represent the possibility of simultaneously controlling the cylinder capacities of the two pumps. The apparatus advantageously includes means for coupling and decoupling the means for controlling the cylinder capacities of the pumps. The coupling and decoupling means can be actuated as a function of the conditions under which the vehicle is travelling. In FIG. 1, reference CP indicates a control unit for controlling the cylinder capacities of the pumps. A line CA represents the possibility, for this control unit, to cause the two cylinder capacities of the two pumps to be coupled. Two lines C52 and C62 show that this unit may also cause the cylinder capacity control means to be decoupled and control these cylinder capacity control means separately. Advantageously, the unit CP receives its control instruction via a line CCP connected to the microprocessor 80. For example, the driver of the vehicle can enter various driving modes in an information box I, which conditions the commands issued by the microprocessor 80.

Advantageously, in each of the driving modes, the cylinder capacities of the pumps are controlled automatically. Thus, advantageously, the apparatus includes a control management unit for managing the control of the cylinder capacities of the pumps 52 and 62, which means comprise means for measuring, for each closed circuit, the delivery pressure of the pump of the circuit (means represented by pressure sensors, respectively 54 for pump 52 and 64 for pump 62), and means for modifying the cylinder capacities of the pumps so as to adjust the measured pressure to match a target pressure (e.g. by servo-control).

Advantageously, the unit for managing the control of the cylinder capacities of the pumps is integrated in the microprocessor 80 which receives the information from the sensors 54 and 64 via information transmission lines, respectively T54 and T64. The target pressure may be a pressure predetermined as a function of the driving program, when the vehicle is traveling under specific conditions. Depending on the driving conditions, it may desirable to match the delivering pressures of the two pumps to the same value, corresponding to the mean value of the delivery pressures detected by the sensors at a given instant. It is also possible to seek to maintain a difference of a predetermined value between the delivery pressures of the two pumps.

For example, the unit for managing the control of the cylinder capacities of the pumps advantageously comprises means for detecting a tight turn situation, and means for controlling the cylinder capacities of the pumps in a manner such as to obtain a pressure in the closed circuit situated on the outside of the turn that is higher than the pressure in the closed circuit situated on the inside of the turn.

The tight turn situation may be detected by the steering sensor 70 when such a sensor is provided. It may also be detected by end-of-stroke sensors of the steering system of the vehicle.

The microprocessor 80 may determine the target pressure that should be assigned to the delivery pressures of each of the two pumps, e.g. by determining a difference between the two pressures, and, as a function of this target pressure, transmit a control instruction to the control unit CP for controlling the cylinder capacities of the pumps. The microprocessor may also determine two target pressures, respectively for each of the two closed circuits.

When, as in FIG. 1, it is the motors 10 and 30 of the circuit 50 that drive the wheels on the outside of the turn, a delivery pressure is chosen that is larger for the pump 52 than for the pump 62. If the cylinder capacities connected to the pumps are equal (which depends on the positions of the selectors 55 and 65), this makes it possible to ensure that the motors 10 and 30 develop torque values that are greater than the torque values developed by the motors 20 and 40, which amounts to intentionally seeking wheel spin on the wheels on the outside of the turn so as to facilitate turning.

On the road, delivery pressures are sought that are equal in each of the two closed circuits, and the unit for managing control of the pumps (e.g. the microprocessor 80) advantageously includes means that, when the vehicle is in an on-road situation, control the cylinder capacities of the pumps in a manner such as to obtain pressures that are substantially equal in each of the two closed circuits. The control unit CP then receives a suitable control instruction from the microprocessor.

FIGS. 1 to 4 show a vehicle having two drivable axles. However, this should not be understood to be limiting, and the apparatus of the invention may further include a third drivable axle having two hydraulic motors, one for each side of the vehicle, the hydraulic motors of the third axle being analogous to the hydraulic motors 30 and 40 of the second axle. Then, for each closed circuit, the first, second and third main connections of the hydraulic motors of the third axle (respectively analogous to the connections 30A, 30B, 30C and to the connections 40A, 40B, 40C) are respectively connected to the first, second, and third main connections (respectively the connections 30A, 30B, 30C and the connections 40A, 40B, 40C) of the hydraulic motor of the second axle.

Thus, on a vehicle having three drivable axles, it is possible to obtain the same features as those described above with the selectors 55 and 65 disposed in the same way as in FIGS. 1 to 4.

What is claimed is:

1. Vehicle transmission apparatus comprising first and second drivable axles, each drivable axle having two hydraulic motors, one on each side of the vehicle, the apparatus comprising two analogous closed transmission circuits, one for each side of the vehicle, each closed circuit having a hydraulic pump as well as a motor of the first axle and a motor of the second axle;

wherein the hydraulic motors of the second axle are dual-capacity motors, each of which comprises two elementary motors, each elementary motor having first and second elementary connections, for feed or discharge purposes, the first elementary connections being in common to form a first main connection of the dual-capacity motor, while the second elementary connections are separate and form respectively a second main connection and a third main connection of the dual-capacity motor, each of the hydraulic motors of the first axle having at least first and second main connections, for feed or discharge purposes, wherein, in each closed circuit, the first main connection of the dual-capacity motor and the first main connection of the motor of the first axle are connected continuously to respective ones of the two ports of the pump of the circuit in question, and wherein each closed circuit further includes a selector having at least two positions, disposed on interconnection ducts between the pump, the second and third main connections of the dual-capacity motor and the second main connection of the motor of the first axle.

2. Apparatus according to claim 1, wherein, for each closed circuit, the selector has a position for deactivating the second axle, in which position it puts in communication the second and third main connections of the dual-capacity motor and causes them to communicate with that port of the pump to which the first main connection of said dual-capacity motor is connected.

3. Apparatus according to claim 1, wherein, for each closed circuit, the selector has a flow-rate sharing position in which the second main connection of the dual-capacity motor is connected to that port of the pump which is connected to the first main connection of the motor of the first axle, in parallel therewith.

4. Apparatus according to claim 3, wherein, for each closed circuit, the selector has a flow-rate sharing and differential lock position in which the third main connection of the dual-capacity motor is connected to the second main connection of the motor of the first axle.

5. Apparatus according to claim 3, wherein, for each closed circuit, the selector has a flow-rate sharing and maximum torque position in which the second and third main connections of the dual-capacity motor and the first main connection of the motor of the first axle are connected in parallel to the same port of the pump while the first main connection of the dual-capacity motor and the second main connection of the motor of the first axle are connected in parallel to the other port of the pump.

6. Apparatus according to claim 4, wherein, for each closed circuit, the selector has a flow-rate sharing and maximum torque position in which the second and third main connections of the dual-capacity motor and the first main connection of the motor of the first axle are connected in parallel to the same port of the pump while the first main connection of the dual-capacity motor and the second main connection of the motor of the first axle are connected in parallel to the other port of the pump.

7. Apparatus according to claim 1, wherein, for each closed circuit, the selector has a flow-rate transfer position for transferring the flow rate to the second axle, in which position the first main connection of the motor of the first axle is connected to a port of the pump, while the second main connection of the dual-capacity motor communicates with that port of the pump which is connected to the first main connection of said dual-capacity motor, and while the third main connection of the dual-capacity motor is connected to the second main connection of the motor of the first axle.

8. Apparatus according to claim 1, wherein, for each closed circuit, the selector has a position for deactivating the second axle, a flow-rate sharing position and a flow-rate transfer position for transferring the flow-rate to the second axle, wherein in said position for deactivating the second axle, the selector puts in communication the second and third main connections of the dual-capacity motor and causes them to communicate with that port of the pump to which the first main connection of said dual-capacity motor is connected, wherein, in said flow-rate sharing position, the second main connection of the dual-capacity motor is connected to that port of the pump which is connected to the first main connection of the motor of the first axle, in parallel therewith and wherein, in said flow-rate transfer position for transferring the flow rate to the second axle, the first main connection of the motor of the first axle is connected to a port of the pump, while the second main connection of the dual-capacity motor communicates with that port of the pump which is connected to the first main connection of said dual-capacity motor, and while the third main connection of the dual-capacity motor is connected to the second main connection of the motor of the first axle.

9. Apparatus according to claim 1, wherein, when the vehicle is in forward drive, for each closed circuit, the first main connection of the motor of the first axle is connected to the delivery port of the pump.

10. Apparatus according to claim 1, including means for controlling the selectors of both of closed circuits simultaneously.

11. Apparatus according to claim 10, including means that, during turning, cause the simultaneous control of the selectors of the two closed circuits to cease, and control said selectors such that the total cylinder capacity connected to a port of the pump of the closed circuit situated on the side of the vehicle that is on the inside of the turn is greater than the total cylinder capacity that is connected to the corresponding port of the pump of the closed circuit situated on the side of the vehicle that is on the outside of the turn.

12. Apparatus according to claim 1, in which the pumps are of variable cylinder capacity, said apparatus including control means for controlling the cylinder capacities of the pumps and coupling and decoupling means for coupling and decoupling these control means, the coupling and decoupling means being suitable for being actuated as a function of the conditions under which the vehicle is traveling.

13. Apparatus according to claim 12, including a unit for managing control of the cylinder capacities of the pumps, which unit includes means for measuring, for each closed circuit, the delivery pressure of the pump of the circuit, and means for modifying the cylinder capacities of the pumps so as to adjust the measured pressure to match it to a target pressure.

14. Apparatus according to claim 13, wherein the unit for managing control of the cylinder capacities of the pumps comprises means for detecting a tight turn situation and means for controlling the cylinder capacities of the pumps in a manner such as to obtain, in the closed circuit situated on the outside of the turn, a pressure greater than the pressure in the closed circuit situated on the inside of the turn.

15. Apparatus according to claim 13, wherein the unit for managing control of the cylinder capacities of the pumps includes means which, in an on-road travel situation, control the cylinder capacities of the pumps in a manner such as to obtain pressures that are substantially equal in both of the closed circuits.

16. Apparatus according to claim 14, wherein the unit for managing control of the cylinder capacities of the pumps includes means which, in an on-road travel situation, control the cylinder capacities of the pumps in a manner such as to obtain pressures that are substantially equal in both of the closed circuits.

17. Apparatus according to claim 1, wherein the first axle is steerable.

18. Apparatus according to claim 1, for a vehicle transmission further including a third drivable axle having two hydraulic motors, one for each side of the vehicle, wherein the hydraulic motors of the third axle are analogous to the hydraulic motors of the second axle, and wherein, for each closed circuit, the first, second, and third main connections of the hydraulic motors of the third axle are respectively connected to the first, second, and third main connections of the hydraulic motor of the second axle.

* * * * *